US012441650B2

(12) United States Patent
Witzmann et al.

(10) Patent No.: US 12,441,650 B2
(45) Date of Patent: Oct. 14, 2025

(54) METHOD AND SYSTEM FOR OBTAINING CUT ELONGATED ELEMENTS

(71) Applicant: Schott AG, Mainz (DE)

(72) Inventors: André Witzmann, Waldershof (DE); Ulla Trinks, Mitterteich (DE)

(73) Assignee: Schott AG, Mainz (DE)

( * ) Notice: Subject to any disclaimer, the term of this patent is extended or adjusted under 35 U.S.C. 154(b) by 508 days.

(21) Appl. No.: 17/903,587

(22) Filed: Sep. 6, 2022

(65) Prior Publication Data

US 2023/0089514 A1 Mar. 23, 2023

(30) Foreign Application Priority Data

Sep. 20, 2021 (EP) .................................... 21197615

(51) Int. Cl.
*C03B 37/16* (2006.01)

(52) U.S. Cl.
CPC ........... *C03B 37/16* (2013.01); *Y10T 428/131* (2015.01); *Y10T 428/1314* (2015.01)

(58) Field of Classification Search
CPC ....... C03B 37/16; C03B 33/037; C03B 33/06; Y10T 428/131; Y10T 428/1314
See application file for complete search history.

(56) References Cited

U.S. PATENT DOCUMENTS

| | | | | |
|---|---|---|---|---|
| 2016/0221736 | A1* | 8/2016 | Hayashi | B65D 57/003 |
| 2018/0162765 | A1 | 6/2018 | Witzmann et al. | |
| 2020/0262705 | A1* | 8/2020 | Vimalanathan | C01B 32/176 |

FOREIGN PATENT DOCUMENTS

| | | | |
|---|---|---|---|
| CN | 112777921 | A | 5/2021 |
| DE | 10 2005 038 764 | B3 | 10/2006 |

(Continued)

OTHER PUBLICATIONS

European Office Action dated Jul. 8, 2022 for European Patent Application No. 21 197 615.4 (7 pages).

*Primary Examiner* — James C Yager
(74) *Attorney, Agent, or Firm* — TAYLOR & EDELSTEIN, PC

(57) ABSTRACT

A bundle includes five or more cut elongated glass elements. Each cut elongated glass element includes a first end, a cylindrical portion, and a second end. At least one of the following equations is fulfilled: i) $(I_{center}(\max)-I_{center}(\min))/I_{center}(\text{mean})\leq 4.0\times10^{-2}$ [μm/μm]; or ii) $(I_{continuous}(\max)-I_{continuous}(\min))/I_{center}(\text{mean})\leq 4.0\times10^{-2}$ [μm/μm]. $I_{center}(\max)$ is a maximum center inner diameter of the cylindrical portions of all cut elongated glass elements; $I_{center}(\min)$ is a minimum center inner diameter of the cylindrical portion of all cut elongated glass elements; $I_{center}(\text{mean})$ is a mean of inner diameters at a center of the cylindrical portions of all cut elongated glass elements; $I_{continuous}(\max)$ is a maximum continuous inner diameter of the cylindrical portion of any single cut elongated glass element; and $I_{continuous}(\min)$ is a minimum continuous inner diameter of the cylindrical portion of the single cut elongated glass element.

19 Claims, 1 Drawing Sheet

(56) References Cited

FOREIGN PATENT DOCUMENTS

| | | | |
|---|---|---|---|
| DE | 10 2006 034 878 | B3 | 11/2007 |
| EP | 3 848 701 | A1 | 7/2021 |
| EP | 3 968 012 | A1 | 3/2022 |
| JP | S53-78219 | A | 7/1978 |

* cited by examiner

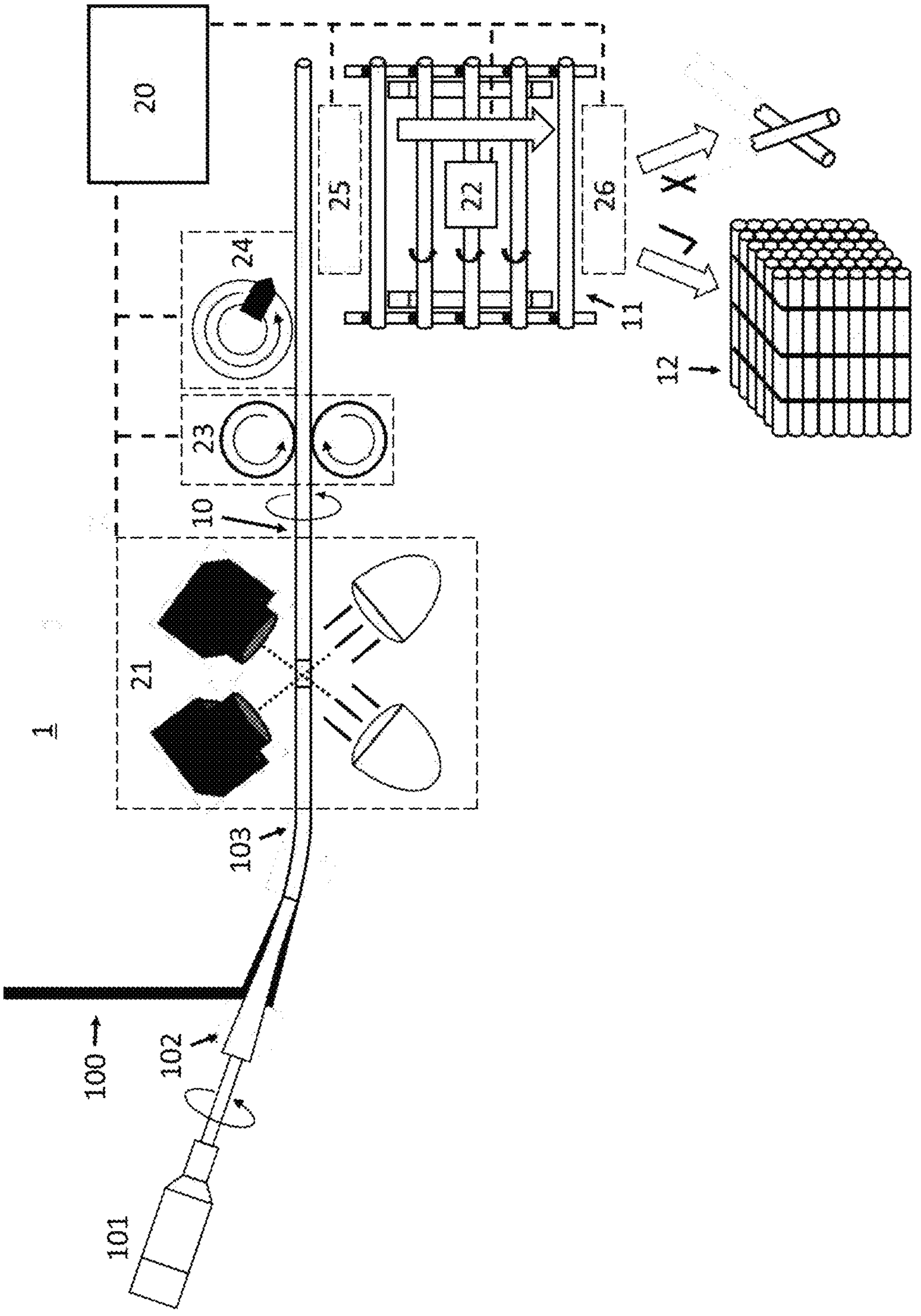
1
20
21
22
23
24
25
26
10
11
12
100
101
102
103
X

METHOD AND SYSTEM FOR OBTAINING CUT ELONGATED ELEMENTS

CROSS REFERENCE TO RELATED APPLICATIONS

This application claims priority to European Patent Application No. EP 21197615.4 filed on Sep. 20, 2021, which is incorporated in its entirety herein by reference.

BACKGROUND OF THE INVENTION

1. Field of the Invention

The invention is related to methods and systems for producing cut elongated glass elements and bundles of such glass elements.

2. Description of the Related Art

Glass tubes are commonly used to produce pharmaceutical packagings, like syringes and cartridges. These syringes or cartridges are used, for example, in auto-injectors or wearable delivery devices, like an insulin pen or wearable insulin delivery devices. In these auto-injectors or wearable delivery devices, a dose of a pharmaceutical composition is administered by moving a plunger by a certain distance within the syringe or cartridge. To minimize the size of these auto-injectors or wearable delivery devices, a practicable way is to minimize the size of the syringe or cartridge installed therein. However, this leads to a reduced number of doses, since, if the size of the syringe or cartridge is reduced, the volume of the syringe or cartridge is also reduced. However, since the exchange of a wearable delivery devices is uncomfortable and a high number of dosages, which can be administered with a single auto-injector, is advantageous, there is a demand to prolong the lifetime of a wearable delivery devices or to increase the number of doses which can be administered with an auto-injector. To achieve this, one way would be to increase the concentration of the medical compound in the syringe or cartridge and thus, to decrease the volume of the pharmaceutical composition administered per dose. However, in order to increase the concentration of the medical compound in the pharmaceutical composition significantly one or more geometric parameter(s), like the inner diameter, of the entire syringe or cartridge need to be known precisely, i.e. in the μm range, do not vary along the cylindrical portion of the syringe or cartridge, and do not differ significantly between the different installed syringes and cartridges when they are changed. This is particularly true since the administered volume is only controlled by the plunger movement. The cylindrical portion of a pharmaceutical packaging made of glass is defined by the part of the glass tube, which has been used to produce the pharmaceutical packaging. These glass tubes are commonly produced by the Danner or Vello process, in which a continuously glass tube is produced and then cut to length.

SUMMARY OF THE INVENTION

In some exemplary embodiments provided according to the invention, a bundle includes five or more cut elongated glass elements. Each cut elongated glass element includes a first end, a cylindrical portion, and a second end. At least one of the following equations is fulfilled: i) $(I_{center}(\max)-I_{center}(\min))/I_{center}(\text{mean})\leq 4.0\times10^{-2}$ [μm/μm]; or ii) $(I_{continuous}(\max)-I_{continuous}(\min))/I_{center}(\text{mean})\leq 4.0\times10^{-2}$ [μm/μm]. $I_{center}(\max)$ is a maximum center inner diameter of the cylindrical portions of all cut elongated glass elements in the bundle; $I_{center}(\min)$ is a minimum center inner diameter of the cylindrical portion of all cut elongated glass elements in the bundle; $I_{center}(\text{mean})$ is a mean of inner diameters at a center of the cylindrical portions of all cut elongated glass elements in the bundle; $I_{continuous}(\max)$ is a maximum continuous inner diameter of the cylindrical portion of any single cut elongated glass element in the bundle; and $I_{continuous}(\min)$ is a minimum continuous inner diameter of the cylindrical portion of the single cut elongated glass element in the bundle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein:

The sole FIGURE is a schematic depiction of an embodiment of a system provided according to the invention.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

It has been recognized that it is advantageous and only possible to determine the continuously measured one or more geometric parameter(s) for the entire glass tube in the μm range before the tube is cut to length, because:

- at this point, the glass tubes lay perfectly for the measurement;
- the surface is perfect (fire-polished) and has minimum defects due to:
- minimum contact with other materials;
- minimum time exposed to the environment, and
- was not cut to length.

In addition, since the measuring apparatuses, which are necessary to inspect a tube in the μm range, are very space-consuming and can only measure a very small area along the tube, it is not possible to arrange measuring apparatuses around the cut tube so that the entire cut tube can be measured. Further, the cut tubes are transported perpendicular to their rotation axis enabling a densely packed production line and allowing further process steps at the end portions of the cut tubes, i.e. fire-polishing or closing the end portions. Thus, the arrangement of measuring apparatuses interferes with further process steps. The challenge of measuring the one or more geometric parameter(s), like the inner diameter, before the continuous glass tube is cut to length, is, that the tube can only be measured a few seconds after the continuous glass tube has reached a temperature below the glass transition temperature, i.e. the point where the molten glass solidifies. In addition, due to the harsh and varying measuring conditions (temperature, air flow and thermal induced refraction anomalies), the measurement is not stable over longer time periods. Thus, it has been recognized that the measurement system installed at a point between the point where the molten glass solidifies and the drawing device, commonly used in the Danner or Vello process, must be continuously calibrated to overcome this drawback so that it is possible to continuously and reliably measure one or more geometric parameter(s), like the inner diameter, in the μm range.

Exemplary embodiments disclosed herein provide a method and/or system which is capable to continuously and reliably inspect the one or more geometric parameter(s), for example the inner diameter, of an elongated glass element, for example a glass tube, up to the μm range.

Further, exemplary embodiments disclosed herein provide a bundle comprising cut elongated glass elements having improved quality, i.e. wherein at least one geometric parameter, like the inner diameter, is within a specific range and is reliably and accurately measured, for example in the μm range.

In some embodiments provided according to the invention, a method for obtaining cut elongated glass elements comprises the steps, optionally in this order:

- providing a continuous elongated glass element;
- continuously measuring one or more geometric parameter(s) of the continuous elongated glass element to obtain one or more continuous geometric parameter(s);
- cutting the continuous elongated glass element to obtain cut elongated glass elements;
- measuring one or more geometric parameter(s) at one or more point(s) along the rotation axis of the cut elongated glass element(s) to obtain one or more individual geometric parameter(s); and
- connecting the one or more of the continuous geometric parameter(s) with the one or more of the individual geometric parameter(s).

The apparatus for continuously measuring the one or more geometric parameter(s) of the continuous elongated glass element, i.e. the first measuring apparatus, is not particularly limited. The apparatus for continuously measuring the one or more geometric parameter(s) of the continuous elongated glass element, i.e. the first measuring apparatus, is optionally a measuring apparatus as described in the EP patent application having the EP application number EP20195758.6, which is herein incorporated by reference. The apparatus for measuring one or more geometric parameter(s) at one or more point(s) along the rotation axis of the cut elongated glass element(s), i.e. the second measuring apparatus, is not particularly limited. The apparatus for measuring one or more geometric parameter(s) at one or more point(s) along the rotation axis of the cut elongated glass element(s), i.e. the second measuring apparatus, is optionally a measuring apparatus as described in EP3848701 (A1) (EP application number EP20150706.8), which is herein incorporated by reference.

Especially by connecting the one or more of the continuous geometric parameter(s) with the one or more of the individual geometric parameter(s), the continuous measurement can be continuously adjusted inline. Thus, the quality of measurement is improved and the one or more geometric parameter(s) can be reliably determined in the μm range. Consequently, cut elongated glass elements having an improved quality can be obtained. In addition, since the one or more geometric parameter(s) are measured at one point two times, the reliability of the measurement is further improved.

In some embodiments, the method comprises the following steps, optionally in this order:

- providing a continuous elongated glass element;
- continuously measuring one or more geometric parameter(s) of the continuous elongated glass element to obtain one or more continuous geometric parameter(s);
- cutting the continuous elongated glass element to obtain cut elongated glass elements;
- sorting out cut elongated glass element(s) exhibiting one or more continuous geometric parameter(s) being not inside a predetermined range;
- measuring one or more geometric parameter(s) at one or more point(s) along the rotation axis of the cut elongated glass element(s) to obtain one or more individual geometric parameter(s);
- connecting the one or more of the continuous geometric parameter(s) with the one or more of the individual geometric parameter(s), optionally controlling whether the cut elongated glass element(s) having one or more of the continuous geometric parameter(s) being not inside a predetermined range has/have been sorted out; and
- optionally sorting out cut elongated glass element(s) exhibiting one or more continuous geometric parameter(s) and/or one or more of the individual geometric parameter(s) being not inside a predetermined range.

Thus, the reliability of the measurement can be improved and the thus, the quality of the obtained cut elongated glass elements can be improved.

In some embodiments, providing a continuous elongated glass element comprises the steps:

- providing a continuous elongated glass element by a Danner or a Vello process, optionally by a Danner process; and
- continuously drawing the continuous elongated glass element by a drawing device, optionally wherein the continuous elongated glass element is continuously drawn while the continuous elongated glass element is continuously measured; and/or
- optionally wherein for the connection of the one or more continuous geometric parameter(s) with the one or more individual geometric parameter(s), the speed of the drawing device is used; and/or
- the cutting the continuous elongated glass element to obtain cut elongated glass elements is performed by a cutting device;
- optionally wherein for the connection of the one or more continuous geometric parameter(s) with the one or more of the individual geometric parameter(s), the point in time of the cutting in the cutting step is used.

Thus, the reliability of the measurement can be improved.

In some embodiments, the method comprises the further step(s):

- using the one or more continuous geometric parameter(s) and/or the one or more individual geometric parameter(s) to identify the cut elongated glass element, optionally at a later production step or the final product; and/or
- bundling the cut elongated glass elements to form a bundle comprising cut elongated glass elements; and/or
- producing one or more, optionally 5 or more, pharmaceutical packaging(s) out of the cut elongated glass element(s); optionally and bundling the pharmaceutical packaging(s) to form a bundle of pharmaceutical packaging(s).

Techniques to form a pharmaceutical packaging out of a cut elongated glass element are well known in the state of the art, e.g. in DE 10 2005 038 764 B3 and DE 10 2006 034 878 B3.

A further aspect of the invention provides a system for obtaining cut elongated glass elements, optionally and for performing the method described herein, comprising:

- a providing apparatus configured for providing a continuous elongated glass element;
- a first measuring apparatus configured for continuously measuring one or more geometric parameter(s) of the continuous elongated glass element to obtain one or more continuous geometric parameter(s);
- a cutting device configured for cutting the continuous elongated glass element to obtain cut elongated glass elements;
- a second measuring apparatus configured for measuring one or more geometric parameter(s) at one or more point(s) along the rotation axis of the cut elongated glass element(s) to obtain one or more individual geometric parameter(s); and
- a computer unit configured for connecting the one or more of the continuous geometric parameter(s) with the one or more of the individual geometric parameter(s).

In some embodiments, a system for obtaining cut elongated glass elements, optionally and for performing the method described herein, and/or optionally according to any embodiment described herein, is provided, comprising:

- a providing apparatus configured for providing a continuous elongated glass element;
- a first measuring apparatus configured for continuously measuring one or more geometric parameter(s) of the continuous elongated glass element to obtain one or more continuous geometric parameter(s);
- a cutting device configured for cutting the continuous elongated glass element to obtain cut elongated glass elements;
- a sorting device configured for sorting out cut elongated glass element(s) exhibiting one or more continuous geometric parameter(s) being not inside a predetermined range;
- a second measuring apparatus configured for measuring one or more geometric parameter(s) at one or more point(s) along the rotation axis of the cut elongated glass element(s) to obtain one or more individual geometric parameter(s);
- a computer unit configured for connecting the one or more of the continuous geometric parameter(s) with the one or more of the individual geometric parameter(s), optionally for controlling whether the cut elongated glass element(s) having one or more continuous geometric parameter(s) being not inside a predetermined range has/have been sorted out; and
- optionally a further sorting device sorting out cut elongated glass element(s) exhibiting one or more continuous geometric parameter(s) and/or one or more of the individual geometric parameter(s) being not inside a predetermined range.

Thus, the reliability of the measurement can be improved and thus, the quality of the obtained cut elongated glass elements can be improved.

In some embodiments, the system further comprises a drawing device, wherein the computer unit uses the speed of the drawing device and/or the point in time of the cutting in the cutting step for connecting the one or more of the continuous geometric parameter(s) with the one or more of the individual geometric parameter(s). Thus, the reliability of the measurement can be further improved.

In some embodiments, the continuous elongated glass element is provided by the Danner or the Vello process, optionally by the Danner process, optionally and wherein the continuous elongated glass element is continuously, optionally and contactless, drawn, optionally through the first measuring apparatus by a/the drawing device, while the one or more continuous geometric parameter(s) are measured. Thus, a continuous elongated glass element, optionally a glass tube, can be provided having already a high quality with regard to the one or more geometric parameter(s), especially the inner diameter, and the amount of cut elongated glass elements, which must be sorted out to obtain a bundle comprising cut elongated glass elements having a high quality with regard to the one or more geometric parameter(s), especially the inner diameter, is reduced. Further, since the quality of all relevant one or more geometric parameter(s) produced by a modern Danner process or a modern Vello process is improved, the overall quality of the cut elongated glass elements can be further improved. Especially modern Danner processes providing a continuous glass having partially the high quality requirements as described below are well known to a person skilled in the art and are, for example, described in "Schott Guide to Glass" (ISBN-10: 9401042306, Springer). However, even when using a process producing a high quality continuous elongated glass element, due to several reasons, e.g. unavoidable process variations, impurities in the educts, weather fluctuations, changes of the ambient temperature, it can not be guaranteed that the quality, especially with regard to one or more specific geometric parameter(s), optionally the inner diameter, is always stable, especially not stable within the μm range.

The cutting process of the continuous elongated glass element is not particularly limited. Optionally, cutting the continuous elongated glass element to obtain cut elongated glass elements is cutting the continuous elongated glass element by scribing the continuous elongated glass element to obtain micro scratches and subsequently breaking the continuous elongated glass element at the micro scratches to obtain cut elongated glass elements. Even if particles are always generated, when this method is used, it is very efficient and has a low reject rate due to bad cutting.

The one or more point(s) along the rotation axis of one or more cut elongated glass element is not particularly limited. Optionally, the cut elongated glass element comprises a first end, a second end and a cylindrical portion, and/or the one or more point(s) along the rotation axis of the cut elongated glass element(s) is/are the first end, the second end and/or the center, optionally the center, of the cylindrical portion of the respective cut elongated glass element. The measurement of the one or more geometric parameter(s) at the first and/or second end may be affected by the cutting process (particles), an end forming processes (condensate), and the transport (scratches). Thus, the measurement at the center may be used.

The time between the measurements of the one or more geometric parameter(s) is not particularly limited. Optionally, the time between the continuous measurement and the measurement at one or more point(s) along the rotation axis is 1 year or less, optionally 30 days or less, optionally 7 days or less, optionally 1 day or less, optionally 12 hours or less, optionally 6 hours or less, optionally 1 hour or less, optionally 30 min or less, optionally 15 min or less, optionally 5 min or less, optionally 2 min or less. If the time between the measurements is too long, it may happen that dust deposits in or on the circular elongated glass element influencing the measurement, especially the (second) measurement at one or more point(s) along the rotation axis. Especially, if the time is 1 hour or less, optionally 30 min or less, optionally 15 min or less, optionally 5 min or less, the reliability of the measurement can be improved. In some embodiments, the time between the continuous measurement and the measurement at one or more point(s) along the rotation axis is 5 seconds or more, optionally 10 seconds or more, optionally 30 seconds or more, optionally 60 seconds or more.

The kind of geometric parameter(s) is/are not particularly limited. It can be any dimension and/or angle of the circular elongated glass element. Optionally, the one or more geometric parameter(s) comprise(s), optionally is/are, the inner diameter I, the outer diameter, the ovality and/or the wall thickness; optionally comprise, optionally is, the inner diameter I; and/or the one or more geometric parameter(s) comprise two or more, optionally 3 or more, optionally 4 or more, optionally 5 or more geometric parameters.

Alternatively or optionally, the one or more individual geometric parameter(s) comprise(s), optionally is/are, the individual inner diameter, the individual outer diameter, the individual ovality and/or the individual wall thickness; optionally comprises, optionally is, the individual inner diameter; and/or the one or more continuous geometric parameter(s) is/are the continuous inner diameter, the continuous outer diameter, the continuous ovality and/or the continuous wall thickness; optionally comprises, optionally is, the continuous inner diameter $I_{continuous}$; and/or the one or more individual geometric parameter(s) is/are the center inner diameter, the center outer diameter, the center ovality and/or the center wall thickness, optionally the center inner diameter $I_{center}$; and/or the one or more geometric parameter(s) obtained by the continuous measurement and the one or more geometric parameter(s) obtained by the measurement at one or more point(s) are the same, optionally are the continuous inner diameter $I_{continuous}$ and the individual inner diameter, optionally the center inner diameter $I_{center}$.

Especially the inner diameter can be determined with the method and/or system described herein very accurate in the µm range.

In some embodiments the continuous measurement comprises a measurement with an interferometer and/or the measurement at one or more point(s) along the rotation axis comprises a measurement with an interferometer. Thus, the reliability of the measurement of the one or more individual geometric parameter(s) can be improved.

The way in which the measurements are connected is not particularly limited. However, it has been recognized that surprisingly the measurement can be significantly improved, if connecting the one or more of the continuous geometric parameter(s) with the one or more of the individual geometric parameter(s) is one or more of:

calibrating, optionally continuously calibrating, the continuous measurement based on the measurement at one or more point(s) along the rotation axis; and/or adapting, optionally continuously adapting, the one or more continuous geometric parameter(s) based on the one or more individual geometric parameter(s); and/or calibrating optionally continuously calibrating, the measurement at one or more point(s) along the rotation axis based on the continuous measurement; and/or adapting, optionally continuously adapting, the one or more individual geometric parameter(s) based on the one or more continuous geometric parameter(s); and/or comparing and/or assigning the one or more continuous geometric parameter(s) with/to the one or more individual geometric parameter(s); and/or comparing and/or assigning the one or more individual geometric parameter(s) with/to the one or more continuous geometric parameter(s); and/or connecting the one or more parameter(s) to obtain information about the quality of a cut elongated glass element with respect to the one or more geometric parameter(s).

In some embodiments, the one or more of the continuous geometric parameter(s) and the one or more of the individual geometric parameter(s) are measured and connected as described herein to obtain information about the quality of a cut elongated glass element with respect to the one or more geometric parameter(s).

Especially, if the values or measurement are continuously calibrated and/or adapted, optionally calibrated, i.e. calibrated and/or adapted, optionally calibrated, every hour or less, optionally every minute or less, optionally every 40 seconds or less; and/or, optionally or, about every fivefold, optionally every double, length of a the circular portion of the circular elongated glass element or less, the reliability of the measure can be significantly improved. In some embodiments, by connecting the one or more of the continuous geometric parameter(s) with the one or more of the individual geometric parameter(s), the measuring point of the one or more of the individual geometric parameter(s) is always connected with the respective measuring point of the one or more of the continuous geometric parameter(s), i.e. the positions, where the one or more geometric parameter(s) are measured are the same. Thus, the measurement can be significantly improved.

Another aspect of the invention provides a bundle comprising 5 or more cut elongated glass elements, wherein each cut elongated glass element comprises:

a) a first end, b) a cylindrical portion, and c) a second end;

wherein one or more of the following equation(s) is/are fulfilled:

$$(I_{center}(\max)-I_{center}(\min))/I_{center}(\text{mean})\leq 4.0\times 10^{-2}\ [\mu m/\mu m];\ \text{and/or} \quad \text{i)}$$

$$(I_{continuous}(\max)-I_{continuous}(\min))/I_{center}(\text{mean})\leq 4.0\times 10^{-2}\ [\mu m/\mu m]; \quad \text{ii)}$$

wherein $I_{center}$(max) is the maximum center inner diameter of the cylindrical portions of all cut elongated glass elements in the bundle;

wherein $I_{center}$(min) is the minimum center inner diameter of the cylindrical portion of all cut elongated glass elements in the bundle;

wherein $I_{center}$(mean) is the mean of the inner diameters at the center of the cylindrical portions of all cut elongated glass elements in the bundle;

wherein $I_{continuous}$(max) is the maximum continuous inner diameter of the cylindrical portion of any single cut elongated glass element in the bundle; and wherein $I_{continuous}$(min) is the minimum continuous inner diameter of the cylindrical portion of said single cut elongated glass element in the bundle.

If the equation(s) i) and/or ii) is/are fulfilled, a bundle of circular elongated glass elements having improved quality is provided. The quality of the bundle can be further improved if both equations i) and ii) are fulfilled.

The lower value of the parameter i) is not particularly limited. However, if the value is too low, the effort to reach this value exceeds the benefit. Thus, optionally the following equation is fulfilled:

$$a\leq(I_{center}(\max)-I_{center}(\min))/I_{center}(\text{mean}); \quad \text{iii)}$$

wherein a [µm/µm] is $1.0\times10^{-6}$, optionally $1.0\times10^{-5}$, optionally $1.0\times10^{-4}$, optionally $1.0\times10^{-3}$, optionally $1.0\times10^{-2}$.

Optionally, the following equation is fulfilled:

$$(I_{center}(\max)-I_{center}(\min))/I_{center}(\text{mean})\leq b; \quad \text{iv)}$$

wherein b [μm/μm] is $4.0\times10^{-2}$, optionally $3.0\times10^{-2}$, optionally $2.0\times10^{-2}$, optionally $1.0\times10^{2}$, optionally $8.0\times10^{-3}$, optionally $6.0\times10^{-3}$, optionally $4.0\times10^{-3}$, optionally $2.0\times10^{-3}$, optionally $1.0\times10^{-3}$, optionally $8.0\times10^{-4}$, optionally $6.0\times10^{-4}$, optionally $4.0\times10^{-4}$, optionally $2.0\times10^{-4}$, optionally $1.0\times10^{-4}$. Thus, the quality of the bundle can be further improved. The bundle is especially suitable for the production of syringes and cartridges, if the value b [μm/μm] is $1.0\times10^{-3}$, optionally $8.0\times10^{-4}$, optionally $6.0\times10^{-4}$, optionally $4.0\times10^{-4}$, optionally $2.0\times10^{-4}$, optionally $1.0\times10^{-4}$.

The lower value of the parameter ii) is not particularly limited. However, if the value is too low, the effort to reach this value exceeds the benefit. Thus, optionally the following equation is fulfilled:

$$c\leq(I_{continuous}(\max)-I_{continuous}(\min))/I_{center}(\text{mean}); \quad \text{v)}$$

wherein c [μm/μm] is $1.0\times10^{-6}$, optionally $1.0\times10^{-5}$, optionally $1.0\times10^{-4}$, optionally $1.0\times10^{-3}$, optionally $1.0\times10^{2}$.

Optionally, the following equation is fulfilled:

$$(I_{continuous}(\max)-I_{continuous}(\min))/I_{center}(\text{mean})\leq d; \quad \text{vi)}$$

wherein d [μm/μm] is $4.0\times10^{-2}$, optionally $3.0\times10^{-2}$, optionally $2.0\times10^{-2}$, optionally $1.0\times10^{2}$, optionally $8.0\times10^{-3}$, optionally $6.0\times10^{-3}$, optionally $4.0\times10^{-3}$, optionally $2.0\times10^{-3}$, optionally $1.0\times10^{-3}$, optionally $8.0\times10^{-4}$, optionally $6.0\times10^{-4}$, optionally $4.0\times10^{-4}$, optionally $2.0\times10^{-4}$, optionally $1.0\times10^{-4}$. Thus the quality of the bundle can be further improved. The bundle is especially suitable for the production of syringes and cartridges, if the value d is $1.0\times10^{-3}$, optionally $8.0\times10^{-4}$, optionally $6.0\times10^{-4}$, optionally $4.0\times10^{-4}$, optionally $2.0\times10^{-4}$, optionally $1.0\times10^{-4}$.

The mean of the center inner diameters of the cylindrical portions of all cut elongated glass elements in the bundle ($I_{center}$(mean)) is not particularly limited. Optionally, $I_{center}$(mean) is 2 mm or more, optionally 3 mm or more, optionally 4 mm or more, optionally 6 mm or more, optionally 8 mm or more, optionally 10 mm or more, optionally 12 mm or more, optionally 14 mm or more, optionally 16 mm or more, optionally 18 mm or more, optionally 20 mm or more, optionally 22 mm or more; and/or, optionally and, $I_{center}$(mean) is 100 mm or less, optionally 75 mm or less, optionally 50 mm or less, optionally 40 mm or less, optionally 30 mm or less, optionally 25 mm or less, optionally 20 mm or less, optionally 17 mm or less, optionally 15 mm or less, optionally 11 mm or less, optionally 9 mm or less, optionally 8 mm or less, optionally 7 mm or less, optionally 6 mm or less, optionally 5 mm or less, optionally 4 mm or less, optionally 3 mm or less. The bundle is especially suitable for the production of syringes and cartridges, if the $I_{center}$(mean) is 4 mm or more, optionally 6 mm or more, optionally 8 mm or more, optionally 10 mm or more; and 30 mm or less, optionally 25 mm or less, optionally 20 mm or less, optionally 17 mm or less, optionally 15 mm or less.

The value for ($I_{center}$(max)−$I_{center}$(min)) is not particularly limited. Optionally, ($I_{center}$(max)−$I_{center}$(min)) is 200 μm or less, optionally 150 μm or less, optionally 120 μm or less, optionally 110 μm or less, optionally 100 μm or less, optionally 90 μm or less, optionally 80 μm or less, optionally 70 μm or less, optionally 65 μm or less, optionally 60 μm or less, optionally 55 μm or less, optionally 50 μm or less, optionally 45 μm or less, optionally 40 μm or less, optionally 35 μm or less, optionally 30 μm or less, optionally 25 μm or less, optionally 20 μm or less, optionally 15 μm or less, optionally 10 μm or less, optionally 5 μm or less. Thus, the quality of the bundle can is further improved. Especially a value of 50 μm or less, optionally 45 μm or less, optionally 40 μm or less, optionally 35 μm or less, optionally 30 μm or less, optionally 25 μm or less, optionally 20 μm or less, optionally 15 μm or less, optionally 10 μm or less, optionally 5 μm or less, may be provided to improve the suitability of the bundle for the production of syringes and cartridges.

The value for ($I_{center}$(max)−$I_{center}$(mean)) and ($I_{center}$(mean)−$I_{center}$(min)) are not particularly limited. Optionally, one or more of the following equation(s) is/are fulfilled:

$$(I_{center}(\max)-I_{center}(\text{mean}))\leq e; \quad \text{vii)}$$

wherein e is 100 μm, optionally 80 μm, optionally 70 μm, optionally 60 μm, optionally 50 μm, optionally 40 μm, optionally 30 μm, optionally 20 μm, optionally 15 μm, optionally 10 μm, optionally 5 μm, optionally 2 μm; and/or, optionally and, $$(I_{center}(\text{mean})-I_{center}(\min))\leq f; \quad \text{viii)}$$

wherein f is 100 μm, optionally 80 μm, optionally 70 μm, optionally 60 μm, optionally 50 μm, optionally 40 μm, optionally 30 μm, optionally 20 μm, optionally 15 μm, optionally 10 μm, optionally 5 μm, optionally 2 μm.

Thus, the quality of the bundle can be further improved. The amount and frequency, respectively, of the continuous measurement are not particularly limited. Optionally, $I_{continuous}$(max) and/or $I_{continuous}$(min) and/or the one or more geometric parameter(s) is/are measured every 20 cm or less, optionally 0.01 cm to 10 cm, optionally 0.05 to 2 cm, optionally 0.1 to 1 cm, optionally every 1.0 mm, along the rotation axis of the elongated glass elements and/or tube. Thus, the quality of the bundle and the reliability of the measurement can be further improved.

According to the invention, the bundle comprises 5 or more cut elongated glass elements. Optionally, the bundle comprises, optionally exhibits, 5 or more, optionally 10 or more, optionally 25 or more, optionally 25 or more, optionally 35 or more, optionally 50 or more, optionally 60 or more, optionally 75 or more, optionally 90 or more, optionally 100 or more, cut elongated glass elements; and/or, optionally and, 1000 or less, optionally 800 or less, optionally 700 or less, optionally 600 or less, optionally 500 or less, optionally 400 or less, optionally 300 or less, optionally 200 or less, optionally 150 or less, optionally 120 or less, optionally 100 or less, cut elongated glass elements. The more cut elongated glass elements there are in a bundle the more difficult it is that each cut elongated glass elements fulfills the parameters described herein; especially, if the bundle comprises 50 or more, optionally 75 or more, optionally 100 or more, cut elongated glass elements.

In some embodiments, the cut elongated glass elements are inspected by a method and/or system according to any embodiment described herein. Thus, a bundle having improved quality is obtained.

In some embodiments, the continuous inner diameter and/or, optionally and, the individual inner diameter of the cut elongated glass elements is/are obtainable by, optionally obtained by, a method and/or system according to any embodiment described herein. Thus, the geometric parameter(s) are reliably measured and thus, the quality of the bundle can be improved.

If the or one of the geometric parameter(s) is/are the inner diameter, the inner diameter can be determined with different methods. Optionally, the inner diameter I and/or $I_{center}$(mean), is/are the average, maximum and/or minimum, optionally the average, of two or more, optionally 2 to 20, optionally 2, 3, 4, 5 or 6, measurements of the inner diameter, optionally perpendicular to each other or equally distributed, at the respective point along the rotation axis of the elongated glass element; and/or wherein the $I_{center}$(max) and $I_{continuous}$(max), respectively, is/are the average, maximum and/or minimum, optionally the maximum, of two or more, optionally 2 to 20, optionally 2, 3, 4, 5 or 6, measurements of the inner diameter, optionally perpendicular to each other or equally distributed, at the respective point along the rotation axis of the elongated glass element; and/or wherein the $I_{center}$(min), and/or $I_{continuous}$(min) is/are the average, maximum and/or minimum, optionally the minimum, of two or more, optionally 2 to 20, optionally 2, 3, 4, 5 or 6, measurements of the inner diameter, optionally perpendicular to each other or equally distributed, at the respective point along the rotation axis of the elongated glass element. It has been recognized that it is sufficient to determine the inner diameters based on two values being perpendicular to each other to reliably determine the specific inner diameter at a point along the rotation axis of the elongated glass element. If more than two inner diameters are used to determine the inner diameter, the reliability can be further improved.

In some embodiments, the inner diameter I, optionally $I_{center}$(max), $I_{center}$(min), $I_{center}$(mean), $I_{continuous}$(max) and/or $I_{continuous}$(min) is/are determinable, optionally determined, by the following equation:

$$I=O-(2*W) \qquad \text{ix)}$$

wherein the outer diameter O is measurable, optionally measured, by laser scanning or telecentric line camera systems; and wherein the wall thickness W is measurable, optionally measured, by an interferometer, optionally in the same direction as the outer diameter O; and/or the inner diameter I, optionally $I_{center}$(max), $I_{center}$(min), $I_{center}$(mean), $I_{continuous}$(max) and/or $I_{continuous}$(min) is/are determinable, optionally determined, by an interferometer. Thus, the reliability of the measurement of the inner diameter can be further improved and the inner diameter can be reliably determined in the μm range. It has been recognized that especially if an interferometer is used to determine the wall thickness and thus inner diameter, the reliability of measurement in the μm range can be further improved. The inner diameter can also be directly measured by an interferometer, especially for small inner diameters (e.g. 5 cm or less, optionally 3 cm or less, optionally 2 cm or less).

The number of values obtained in the measurements is not particularly limited. Optionally, the number of measurements of the one or more geometric parameter(s) for each cut elongated glass element is 5 to $1*10^{10}$, optionally 10 to $10^5$, optionally 50 to $10^4$, optionally 100 to 1000. Thus, the quality can be further improved.

The glass is not particularly limited. Optionally, the glass is a borosilicate glass, an aluminosilicate glass, a lithium-aluminosilicate (LAS) glass, a soda-lime glass, or a lead glass, optionally a borosilicate glass; and/or the glass is a Type I glass according to ASTM E 438 and/or European Pharmaocopeia. Thus, a bundle comprising high quality cut elongated glass elements being suitable for the production of pharmaceutical packing is provided.

The composition of the glass is not particularly limited. Optionally, the composition of the glass comprises, in mass-%:

Si: 30 to 98%, optionally 50 to 90%, optionally 70.0 to 74.0%; and/or $B_2O_3$: 0 to 30%, optionally 3 to 20%, optionally 7.0 to 16.0%; and/or $Al_2O_3$: 0 to 30%, optionally 1 to 15%, optionally 3.0 to 6.5%; and/or $X_2O$: 0 to 30%, optionally 1 to 15%, optionally 2.0 to 7.2%, wherein X is selected from Na, K, Li, optionally X is Na and/or K; and/or YO: 0 to 30%, optionally 0.1 to 5%, optionally 0.5 to 1.0%, wherein Y is selected from Ca, Mg, Ba, optionally Y is Ca and/or Mg.

In some embodiments, the composition of the glass consist of, in mass-%:

Si: 30 to 98%, optionally 50 to 90%, optionally 70.0 to 74.0%;

$B_2O_3$: 0 to 30%, optionally 3 to 20%, optionally 7.0 to 16.0%;

$Al_2O_3$: 0 to 30%, optionally 1 to 15%, optionally 3.0 to 6.5%;

$X_2O$: 0 to 30%, optionally 1 to 15%, optionally 2.0 to 7.2%, wherein X is selected from Na, K, Li, optionally X is Na and/or K;

YO: 0 to 30%, optionally 0.1 to 5%, optionally 0.5 to 1.0%, wherein Y is selected from Ca, Mg, Ba, optionally Y is Ca and/or Mg; and unavoidable impurities.

In some embodiments, the composition of the glass comprises, in mass-%:

Si: 20 to 98%, optionally 40 to 75%, optionally 50 to 65%; and/or $B_2O_3$: 0 to 30%, optionally 1 to 15%, optionally 3 to 9%; and/or $Al_2O_3$: 0 to 30%, optionally 10 to 20%, optionally 13 to 18; and/or $X_2O$: 0 to 30%, optionally 0 to 5%, optionally 0 to 3%, wherein X is selected from Na, K, Li, optionally X is Na and/or K; and/or YO: 0 to 50%, optionally 0.1 to 40%, optionally 10 to 35, wherein Y is selected from Ca, Mg, Ba, optionally Y is Ca and/or Mg.

In some embodiments, the composition of the glass consist of, in mass-%:

Si: 20 to 98%, optionally 40 to 75%, optionally 50 to 65%;

$B_2O_3$: 0 to 30%, optionally 1 to 15%, optionally 3 to 9%;

$Al_2O_3$: 0 to 30%, optionally 10 to 20%, optionally 13 to 18;

$X_2O$: 0 to 30%, optionally 0 to 5%, optionally 0 to 3%, wherein X is selected from Na, K, Li, optionally X is Na and/or K;

YO: 0 to 50%, optionally 0.1 to 40%, optionally 10 to 35, wherein Y is selected from Ca, Mg, Ba, optionally Y is Ca and/or Mg; and unavoidable impurities.

The shape of the elongated glass element is not particularly limited, optionally the elongated glass element is a tube or rod, optionally a tube; and/or the cut elongated glass elements is a cut glass tube, a cut glass rod or a glass pharmaceutical packaging; and/or wherein the cut elongated glass elements is a cut glass tube comprising a first end, a cylindrical portion and/or, optionally and, a second end, wherein the first and/or second end are open or closed, optionally wherein the first end and second end are open or closed.

In some embodiments, the elongated glass element is a tube or rod, optionally a tube, wherein the length of the tube or rod is not particularly limited. Optionally, the cut elongated glass element is a tube or rod and/or, optionally and, comprises a first end, a second end and cylindrical portion, and the length of the cylindrical portion of the cut elongated glass element is 1 cm or more and 1000 cm or less, optionally 20 cm or more and 400 cm or less, optionally 60 cm or more and 300 cm or less, optionally 100 cm or more and 200 cm or less, optionally 120 cm or more and 180 cm or less. Especially, if the length is 200 cm or less, optionally 180 cm or less, the one or more geometric parameter(s) can be reliably determined. Thus, the quality of the bundle can be further improved.

The bundle of tubes can be used to produce a plurality of pharmaceutical packagings. These pharmaceutical packagings, in turn, can be packed in a bundle as well. Thus, a bundle having the same or even better quality with regard to one or more geometric parameter(s), optionally the inner diameter, can be obtained, wherein the cut elongated glass element is a pharmaceutical packaging. Thus, in some embodiments, the cut elongated glass element is a pharmaceutical packaging and/or, optionally and, comprises a first end, a second end and cylindrical portion, and the length of the cylindrical portion of the cut elongated glass element is 1 mm or more and 50 cm or less, optionally 0.5 cm or more and 40 cm or less, optionally 1.0 cm or more and 30 cm or less, optionally 2 cm or more and 20 cm or less, optionally 3 cm or more and 15 cm or less, optionally 4 cm or more and 12 cm or less, optionally 5 cm or more and 10 cm or less, optionally 6 cm or more and 8 cm or less.

In some embodiments, the elongated glass element comprises a cylindrical portion, which exhibits an outer diameter of 0.5 mm to 500 mm, optionally 2 mm to 63 mm, optionally 5 mm to 60 mm, optionally 6 mm to 50 mm; and/or the elongated glass element comprises a cylindrical portion, wherein the cylindrical portion is a tube and exhibits a wall thickness of 0.001 mm to 250 mm, optionally 0.1 mm to 32.5 mm, optionally 0.2 mm to 30 mm, optionally 0.25 mm to 25 mm. Thus, the inner diameter can be reliably determined and the quality of the measurement or bundle is further improved.

Another aspect of the invention provides a pharmaceutical packaging producible, optionally produced, from one or more cut elongated glass elements of the bundle described herein.

A further aspect of the invention provides the use of one or more cut elongated glass elements of the bundle described herein to produce a pharmaceutical packaging or a technical glass, optionally a pharmaceutical packaging.

The kind of the pharmaceutical packaging is not particularly limited. Optionally, the pharmaceutical packaging is a vial, ampule, syringe and/or cartridge, optionally a syringe or cartridge.

Herein, all embodiments of the method also apply for the system, the bundle and the use described herein and vice versa.

Unavoidable impurities herein are impurities, which may be contained in the educts, e.g. Fe, Ti, Zn, Cu, Mn, Co. Optionally, the total amount of all unavoidable impurities is 5 wt.-% or less, optionally 2.5 wt.-% or less, optionally 1.0 wt.-% or less, optionally 0.5 wt.-% or less, optionally 0.1 wt.-% or less, optionally 0.01 wt.-% or less.

The cut elongated glass elements are optionally packed in a bundle. Herein, a bundle is a trading, loading or packaging unit for distribution of cut elongated glass elements, optionally empty cut elongated glass elements, i.e. cut elongated glass elements filled with a gas, e.g. air. For example, products usually, but not necessarily, of the same kind are combined as bundles when ordered together in retail or bundled in logistics. According to the invention, the cut elongated glass elements can be separated by a spacer, for example a plastic and/or paper sheet or fixed in a carrier plate, so that they are not in contact with each other during transport. Usually, but not necessarily, the bundle is at least partly covered by a plastic foil. An example of a bundle is the DENSOPACK® or the SCHOTT iQ® platform from SCHOTT AG. Optionally, several, e.g. 2 to 1000 bundles, optionally 20 to 200 bundles are stacked on a pallet. Thus, according to some embodiments provided according to the invention, a pallet comprises 2 to 1000 bundles, optionally 20 to 200 bundles, according to any embodiment described herein.

Herein, the center of cylindrical portion of the circular elongated glass element is center ±10%, optionally ±7%, optionally ±5%, optionally ±3%, of the length of the cylindrical portion of the circular elongated glass element, optionally is the center of the circular elongated glass element.

The interferometer is not particularly limited. Optionally, for the measurement an interferometric CHRocodile system from Precitec Optronik GmbH is used.

Herein an elongated glass element is an element that comprises a cylindrical portion, optionally only one cylindrical portion. Optionally, the elongated glass element is a circular elongated glass element. The rotation axis of the circular elongated glass element is defined by the rotation axis of the cylindrical portion of the circular elongated glass element. The cylindrical portion of the circular elongated glass element might be hollow. Moreover, the cut elongated glass element might exhibit an open and/or a closed end and/or a narrowing and/or broadening. Optionally, the circular elongated glass element is a tube or a rod, optionally a tube.

The predetermined range might be any range. If the predetermined range is for example a length in mm, a predetermined range might be a single value in mm+30%, optionally ±20%, optionally ±10%, optionally ±5%, optionally ±3%, optionally ±1%.

Herein, the point where the molten glass solidifies is the point at which the temperature of the material of the (cut) circular elongated glass element reached the glass transition temperature of the material. If not stated otherwise, the glass transition temperature is measured by differential scanning calorimetry (DSC).

There are several ways how to design and further develop the teachings of the present invention in an advantageous way. To this end, it is to be referred to the patent claims subordinate to the independent patent claims, to the above explanation(s) of exemplary embodiments, the following items, and the following examples of embodiments illustrated by the FIGURE(S). The combination of two or more, for example 2, 3, 4 or 5 exemplary embodiments is provided. In summary, some exemplary embodiments are the following items:

1. A method for obtaining cut elongated glass elements, comprising the steps, optionally in this order:
   - providing a continuous elongated glass element, optionally by a providing apparatus;
   - continuously measuring one or more geometric parameter (s) of the continuous elongated glass element to obtain one or more continuous geometric parameter(s), optionally by a first measuring apparatus;
   - cutting the continuous elongated glass element to obtain cut elongated glass elements, optionally by a cutting device;
   - measuring one or more geometric parameter(s) at one or more point(s) along the rotation axis of the cut elongated glass element(s), optionally the cut elongated glass elements, to obtain one or more individual geometric parameter(s), optionally by a second measuring apparatus; and connecting the one or more of the continuous geometric parameter(s) with the one or more of the individual geometric parameter(s), optionally by a computer unit.

2. A method according to any one of the preceding items, comprising the following steps, optionally in this order:

providing a continuous elongated glass element;

continuously measuring one or more geometric parameter(s) of the continuous elongated glass element to obtain one or more continuous geometric parameter(s);

cutting the continuous elongated glass element to obtain cut elongated glass elements;

sorting out cut elongated glass element(s) exhibiting one or more continuous geometric parameter(s) being not inside a predetermined range;

measuring one or more geometric parameter(s) at one or more point(s) along the rotation axis of the cut elongated glass element(s) to obtain one or more individual geometric parameter(s);

connecting the one or more of the continuous geometric parameter(s) with the one or more of the individual geometric parameter(s), optionally controlling whether the cut elongated glass element(s) having one or more of the continuous geometric parameter(s) being not inside a predetermined range has/have been sorted out; and optionally sorting out cut elongated glass element(s) exhibiting one or more continuous geometric parameter(s) and/or one or more of the individual geometric parameter(s) being not inside a predetermined range.

3. A method according to any one of the preceding items:

wherein providing a continuous elongated glass element comprises the steps:

providing a continuous elongated glass element by a Danner or a Vello process, optionally by a Danner process; and continuously drawing the continuous elongated glass element by a drawing device, optionally wherein the continuous elongated glass element is continuously drawn while the continuous elongated glass element is continuously measured; and/or optionally wherein for the connection of the one or more continuous geometric parameter(s) with the one or more individual geometric parameter(s), the speed of the drawing device is used.

4. A method according to any one of the preceding items:

wherein the cutting the continuous elongated glass element to obtain cut elongated glass elements is performed by a cutting device;

optionally wherein for the connection of the one or more continuous geometric parameter(s) with the one or more of the individual geometric parameter(s), the point in time of the cutting in the cutting step is used.

5. A method according to any one of the preceding items, comprising the further step(s):

using the one or more continuous geometric parameter(s) and/or the one or more individual geometric parameter(s) to identify the cut elongated glass element, optionally at a later production step or the final product; and/or bundling the cut elongated glass elements to form a bundle comprising cut elongated glass elements; and/or producing one or more, optionally 5 or more, pharmaceutical packaging(s) out of the cut elongated glass element(s); optionally and bundling the pharmaceutical packaging(s) to form a bundle of pharmaceutical packaging(s).

6. A system for obtaining cut elongated glass elements, optionally and for performing the method according to any one of the preceding items, comprising.

a providing apparatus configured for providing a continuous elongated glass element;

a first measuring apparatus configured for continuously measuring one or more geometric parameter(s) of the continuous elongated glass element to obtain one or more continuous geometric parameter(s);

a cutting device configured for cutting the continuous elongated glass element to obtain cut elongated glass elements;

a second measuring apparatus configured for measuring one or more geometric parameter(s) at one or more point(s) along the rotation axis of the cut elongated glass element(s) to obtain one or more individual geometric parameter(s); and a computer unit configured for connecting the one or more of the continuous geometric parameter(s) with the one or more of the individual geometric parameter(s).

7. A system for obtaining cut elongated glass elements, optionally and for performing the method according to any one of the preceding items, and/or optionally according to any one of the preceding items; comprising:

a providing apparatus configured for providing a continuous elongated glass element;

a first measuring apparatus configured for continuously measuring one or more geometric parameter(s) of the continuous elongated glass element to obtain one or more continuous geometric parameter(s);

a cutting device configured for cutting the continuous elongated glass element to obtain cut elongated glass elements;

a sorting device configured for sorting out cut elongated glass element(s) exhibiting one or more continuous geometric parameter(s) being not inside a predetermined range;

a second measuring apparatus configured for measuring one or more geometric parameter(s) at one or more point(s) along the rotation axis of the cut elongated glass element(s) to obtain one or more individual geometric parameter(s);

a computer unit configured for connecting the one or more of the continuous geometric parameter(s) with the one or more of the individual geometric parameter(s), optionally for controlling whether the cut elongated glass element(s) having one or more continuous geometric parameter(s) being not inside a predetermined range has/have been sorted out; and optionally a further sorting device sorting out cut elongated glass element(s) exhibiting one or more continuous geometric parameter(s) and/or one or more of the individual geometric parameter(s) being not inside a predetermined range.

8. A system according to any one of the preceding items, further comprising a drawing device;

wherein the computer unit uses the speed of the drawing device and/or the point in time of the cutting in the cutting step for connecting the one or more of the continuous geometric parameter(s) with the one or more of the individual geometric parameter(s).

9. A method and/or system according to any one of the preceding items, wherein the continuous elongated glass element is provided by the Danner or the Vello process, optionally by the Danner process, optionally and wherein the continuous elongated glass element is continuously, optionally and contactless, drawn, optionally through the first measuring apparatus by a/the drawing device, while the one or more continuous geometric parameter(s) are measured.

10. A method and/or system according to any one of the preceding items, wherein cutting the continuous elongated glass element to obtain cut elongated glass elements is cutting the continuous elongated glass element by scribing the continuous elongated glass element to obtain micro scratches and subsequently breaking the continuous elongated glass element at the micro scratches to obtain cut elongated glass elements.

11. A method and/or system according to any one of the preceding items, wherein the cut elongated glass element comprises a first end, a second end and a cylindrical portion, and/or wherein the one or more point(s) along the rotation axis of the cut elongated glass element(s) is/are the first end, the second end and/or the center, optionally the center, of the cylindrical portion of the respective cut elongated glass element.

12. A method and/or system according to any one of the preceding items, wherein the time between the continuous measurement and the measurement at one or more point(s) along the rotation axis is 1 year or less, optionally 30 days or less, optionally 7 days or less, optionally 1 day or less, optionally 12 hours or less, optionally 6 hours or less, optionally 1 hour or less, optionally 30 min or less, optionally 15 min or less, optionally 5 min or less, optionally 2 min or less.

13. A method and/or system according to any one of the preceding items, wherein the one or more geometric parameter(s) comprise(s), optionally is/are, the inner diameter I, the outer diameter, the ovality and/or the wall thickness; optionally comprise, optionally is, the inner diameter I; and/or wherein the one or more geometric parameter(s) comprise two or more, optionally 3 or more, optionally 4 or more, optionally 5 or more geometric parameters.

14. A method and/or system according to any one of the preceding items, wherein the one or more individual geometric parameter(s) comprise(s), optionally is/are, the individual inner diameter, the individual outer diameter, the individual ovality and/or the individual wall thickness; optionally comprises, optionally is, the individual inner diameter; and/or wherein the one or more continuous geometric parameter(s) is/are the continuous inner diameter, the continuous outer diameter, the continuous ovality and/or the continuous wall thickness; optionally comprises, optionally is, the continuous inner diameter $I_{continuous}$; and/or wherein the one or more individual geometric parameter(s) is/are the center inner diameter, the center outer diameter, the center ovality and/or the center wall thickness, optionally the center inner diameter $I_{center}$; and/or wherein the one or more geometric parameter(s) obtained by the continuous measurement and the one or more geometric parameter(s) obtained by the measurement at one or more point(s) are the same, optionally are the continuous inner diameter $I_{continuous}$ and the individual inner diameter, optionally the center inner diameter $I_{center}$.

15. A method and/or system according to any one of the preceding items, wherein the continuous measurement comprises a measurement with an interferometer.

16. A method and/or system according to any one of the preceding items, wherein the measurement at one or more point(s) along the rotation axis comprises a measurement with an interferometer.

17. A method and/or system according to any one of the preceding items, wherein connecting the one or more of the continuous geometric parameter(s) with the one or more of the individual geometric parameter(s) is one or more of:

calibrating, optionally continuously calibrating, the continuous measurement based on the measurement at one or more point(s) along the rotation axis; and/or adapting, optionally continuously adapting, the one or more continuous geometric parameter(s) based on the one or more individual geometric parameter(s); and/or calibrating optionally continuously calibrating, the measurement at one or more point(s) along the rotation axis based on the continuous measurement; and/or adapting, optionally continuously adapting, the one or more individual geometric parameter(s) based on the one or more continuous geometric parameter(s); and/or comparing and/or assigning the one or more continuous geometric parameter(s) with/to the one or more individual geometric parameter(s); and/or comparing and/or assigning the one or more individual geometric parameter(s) with/to the one or more continuous geometric parameter(s); and/or connecting the one or more parameter(s) to obtain information about the quality of a cut elongated glass element with respect to the one or more geometric parameter(s).

18. A bundle comprising 5 or more cut elongated glass elements, wherein each cut elongated glass element comprises:

a) a first end, b) a cylindrical portion, and c) a second end;

wherein one or more of the following equation(s) is/are fulfilled:

$$(I_{center}(\max)-I_{center}(\min))/I_{center}(\text{mean})\leq 4.0\times 10^{-2}\ [\mu m/\mu m];\ \text{and/or} \qquad \text{i)}$$

$$(I_{continuous}(\max)-I_{continuous}(\min))/I_{center}(\text{mean})\leq 4.0\times 10^{-2}\ [\mu m/\mu m]; \qquad \text{ii)}$$

wherein $I_{center}(\max)$ is the maximum center inner diameter of the cylindrical portions of all cut elongated glass elements in the bundle;

wherein $I_{center}(\min)$ is the minimum center inner diameter of the cylindrical portion of all cut elongated glass elements in the bundle;

wherein $I_{center}(\text{mean})$ is the mean of the inner diameters at the center of the cylindrical portions of all cut elongated glass elements in the bundle;

wherein $I_{continuous}(\max)$ is the maximum continuous inner diameter of the cylindrical portion of any single cut elongated glass element in the bundle; and wherein $I_{continuous}(\min)$ is the minimum continuous inner diameter of the cylindrical portion of said single cut elongated glass element in the bundle.

19. A bundle according to any one of the preceding items, wherein the following equation is fulfilled:

$$a \leq (I_{center}(\max) - I_{center}(\min))/I_{center}(\text{mean}); \quad \text{iii)}$$

wherein a [µm/µm] is $1.0\times10^{-6}$, optionally $1.0\times10^{-5}$, optionally $1.0\times10^{-4}$, optionally $1.0\times10^{-3}$, optionally $1.0\times10^{2}$.

20. A bundle according to any one of the preceding items, wherein the following equation is fulfilled:

$$(I_{center}(\max) - I_{center}(\min))/I_{center}(\text{mean}) \leq b; \quad \text{iv)}$$

wherein b [µm/µm] is $4.0\times10^{-2}$, optionally $3.0\times10^{-2}$, optionally $2.0\times10^{-2}$, optionally $1.0\times10^{-2}$, optionally $8.0\times10^{-3}$, optionally $6.0\times10^{-3}$, optionally $4.0\times10^{-3}$, optionally $2.0\times10^{-3}$, optionally $1.0\times10^{-3}$, optionally $8.0\times10^{-4}$, optionally $6.0\times10^{-4}$, optionally $4.0\times10^{-4}$, optionally $2.0\times10^{-4}$, optionally $1.0\times10^{-4}$.

21. A bundle according to any one of the preceding items, wherein the following equation is fulfilled:

$$c \leq (I_{continuous}(\max) - I_{continuous}(\min))/I_{center}(\text{mean}); \quad \text{v)}$$

wherein c [µm/µm] is $1.0\times10^{-6}$, optionally $1.0\times10^{-5}$, optionally $1.0\times10^{-4}$, optionally $1.0\times10^{-3}$, optionally $1.0\times10^{2}$.

22. A bundle according to any one of the preceding items, wherein the following equation is fulfilled:

$$(I_{continuous}(\max) - I_{continuous}(\min))/I_{center}(\text{mean}) \leq d; \quad \text{vi)}$$

wherein d [µm/µm] is $4.0\times10^{-2}$, optionally $3.0\times10^{-2}$, optionally $2.0\times10^{-2}$, optionally $1.0\times10^{-2}$, optionally $8.0\times10^{-3}$, optionally $6.0\times10^{-3}$, optionally $4.0\times10^{-3}$, optionally $2.0\times10^{-3}$, optionally $1.0\times10^{-3}$, optionally $8.0\times10^{-4}$, optionally $6.0\times10^{-4}$, optionally $4.0\times10^{-4}$, optionally $2.0\times10^{-4}$, optionally $1.0\times10^{-4}$.

23. A bundle according to any one of the preceding items, wherein $I_{center}(\text{mean})$ is 2 mm or more, optionally 3 mm or more, optionally 4 mm or more, optionally 6 mm or more, optionally 8 mm or more, optionally 10 mm or more, optionally 12 mm or more, optionally 14 mm or more, optionally 16 mm or more, optionally 18 mm or more, optionally 20 mm or more, optionally 22 mm or more; and/or, optionally and, wherein $I_{center}(\text{mean})$ is 100 mm or less, optionally 75 mm or less, optionally 50 mm or less, optionally 40 mm or less, optionally 30 mm or less, optionally 25 mm or less, optionally 20 mm or less, optionally 17 mm or less, optionally 15 mm or less, optionally 11 mm or less, optionally 9 mm or less, optionally 8 mm or less, optionally 7 mm or less, optionally 6 mm or less, optionally 5 mm or less, optionally 4 mm or less, optionally 3 mm or less.

24. A bundle according to any one of the preceding items, wherein $(I_{center}(\max) - I_{center}(\min))$ is 200 µm or less, optionally 150 µm or less, optionally 120 µm or less, optionally 110 µm or less, optionally 100 µm or less, optionally 90 µm or less, optionally 80 µm or less, optionally 70 µm or less, optionally 65 µm or less, optionally 60 µm or less, optionally 55 µm or less, optionally 50 µm or less, optionally 45 µm or less, optionally 40 µm or less, optionally 35 µm or less, optionally 30 µm or less, optionally 25 µm or less, optionally 20 µm or less, optionally 15 µm or less, optionally 10 µm or less, optionally 5 µm or less.

25. A bundle according to any one of the preceding items, wherein one or more of the following equation(s) is/are fulfilled:

$$(I_{center}(\max) - I_{center}(\text{mean})) \leq e; \quad \text{vii)}$$

wherein e is 100 µm, optionally 80 µm, optionally 70 µm, optionally 60 µm, optionally 50 µm, optionally 40 µm, optionally 30 µm, optionally 20 µm, optionally 15 µm, optionally 10 µm, optionally 5 µm, optionally 2 µm; and/or, optionally and, $$(I_{center}(\text{mean}) - I_{center}(\min)) \leq f; \quad \text{viii)}$$

wherein f is 100 µm, optionally 80 µm, optionally 70 µm, optionally 60 µm, optionally 50 µm, optionally 40 µm, optionally 30 µm, optionally 20 µm, optionally 15 µm, optionally 10 µm, optionally 5 µm, optionally 2 µm.

26. A bundle according to any one of the preceding items, wherein $I_{continuous}(\max)$ and/or $I_{continuous}(\min)$ and/or the one or more geometric parameter(s) is/are measured every 20 cm or less, optionally 0.01 cm to 10 cm, optionally 0.05 to 2 cm, optionally 0.1 to 1 cm, optionally every 1.0 mm, along the rotation axis of the elongated glass elements and/or tube.

27. A bundle according to any one of the preceding items, wherein the bundle comprises, optionally exhibits, 5 or more, optionally 10 or more, optionally 25 or more, optionally 25 or more, optionally 35 or more, optionally 50 or more, optionally 60 or more, optionally 75 or more, optionally 90 or more, optionally 100 or more, cut elongated glass elements; and/or, optionally and, 1000 or less, optionally 800 or less, optionally 700 or less, optionally 600 or less, optionally 500 or less, optionally 400 or less, optionally 300 or less, optionally 200 or less, optionally 150 or less, optionally 120 or less, optionally 100 or less, cut elongated glass elements.

28. A bundle comprising 5 or more cut elongated glass elements, optionally according to any one of the preceding items, wherein the cut elongated glass elements are inspected by a method and/or system according to any one of the preceding items.

29. A bundle according to any one of the preceding items, wherein the continuous inner diameter and/or, optionally and, the individual inner diameter of the cut elongated glass elements is/are obtainable by, optionally obtained by, a method and/or system according to any one of the preceding items.

30. A method, system and/or bundle; according to any one of the preceding items, wherein the inner diameter I and/or $I_{center}(\text{mean})$, is/are the average, maximum and/or minimum, optionally the average, of two or more, optionally 2 to 20, optionally 2, 3, 4, 5 or 6, measurements of the inner diameter, optionally perpendicular to each other or equally distributed, at the respective point along the rotation axis of the elongated glass element; and/or wherein the $I_{center}(\max)$ and $I_{continuous}(\max)$, respectively, is/are the average, maximum and/or minimum, optionally the maximum, of two or more, optionally 2 to 20, optionally 2, 3, 4, 5 or 6, measurements of the inner diameter, optionally perpendicular to each other or equally distributed, at the respective point along the rotation axis of the elongated glass element; and/or wherein the $I_{center}(\min)$, and/or $I_{continuous}(\min)$ is/are the average, maximum and/or minimum, optionally the minimum, of two or more, optionally 2 to 20, optionally 2, 3, 4, 5 or 6, measurements of the inner diameter, optionally perpendicular to each other or equally distributed, at the respective point along the rotation axis of the elongated glass element.

31. A method, system and/or bundle; according to any one of the preceding items, wherein the inner diameter I, optionally $I_{center}$(max), $I_{center}$(min), $I_{center}$(mean), $I_{continuous}$(max) and/or $I_{continuous}$(min) is/are determinable, optionally determined, by the following equation:

$$I=O-(2*W) \quad \text{ix)}$$

wherein the outer diameter O is measurable, optionally measured, by laser scanning or telecentric line camera systems; and wherein the wall thickness W is measurable, optionally measured, by an interferometer, optionally in the same direction as the outer diameter O; and/or wherein the inner diameter I, optionally $I_{center}$(max), $I_{center}$(min), $I_{center}$(mean), $I_{continuous}$(max) and/or $I_{continuous}$(min) is/are determinable, optionally determined, by an interferometer.

32. A method, system and/or bundle; according to any one of the preceding items, wherein the number of measurements of the one or more geometric parameter(s) for each cut elongated glass element is 5 to 1*1010, optionally 10 to 105, optionally 50 to 104, optionally 100 to 1000.

33. A method, system and/or bundle; according to any one of the preceding items, wherein the glass is a borosilicate glass, an aluminosilicate glass, a lithium-aluminosilicate (LAS) glass, a soda-lime glass, or a lead glass, optionally a borosilicate glass; and/or wherein the glass is a Type I glass according to ASTM E 438 and/or European Pharmaocopeia.

34. A method, system and/or bundle; according to any one of the preceding items, wherein the composition of the glass comprises, in mass-%:

Si: 30 to 98%, optionally 50 to 90%, optionally 70.0 to 74.0%; and/or $B_2O_3$: 0 to 30%, optionally 3 to 20%, optionally 7.0 to 16.0%; and/or $Al_2O_3$: 0 to 30%, optionally 1 to 15%, optionally 3.0 to 6.5%; and/or $X_2O$: 0 to 30%, optionally 1 to 15%, optionally 2.0 to 7.2%, wherein X is selected from Na, K, Li, optionally X is Na and/or K; and/or YO: 0 to 30%, optionally 0.1 to 5%, optionally 0.5 to 1.0%, wherein Y is selected from Ca, Mg, Ba, optionally Y is Ca and/or Mg.

35. A method, system and/or bundle; according to any one of the preceding items, wherein the composition of the glass consist of, in mass-%:

Si: 30 to 98%, optionally 50 to 90%, optionally 70.0 to 74.0%;

$B_2O_3$: 0 to 30%, optionally 3 to 20%, optionally 7.0 to 16.0%;

$Al_2O_3$: 0 to 30%, optionally 1 to 15%, optionally 3.0 to 6.5%;

$X_2O$: 0 to 30%, optionally 1 to 15%, optionally 2.0 to 7.2%, wherein X is selected from Na, K, Li, optionally X is Na and/or K;

YO: 0 to 30%, optionally 0.1 to 5%, optionally 0.5 to 1.0%, wherein Y is selected from Ca, Mg, Ba, optionally Y is Ca and/or Mg; and unavoidable impurities.

36. A method, system and/or bundle; according to any one of the preceding items, wherein the composition of the glass comprises, in mass-%:

Si: 20 to 98%, optionally 40 to 75%, optionally 50 to 65%; and/or $B_2O_3$: 0 to 30%, optionally 1 to 15%, optionally 3 to 9%; and/or $Al_2O_3$: 0 to 30%, optionally 10 to 20%, optionally 13 to 18; and/or $X_2O$: 0 to 30%, optionally 0 to 5%, optionally 0 to 3%, wherein X is selected from Na, K, Li, optionally X is Na and/or K; and/or YO: 0 to 50%, optionally 0.1 to 40%, optionally 10 to 35, wherein Y is selected from Ca, Mg, Ba, optionally Y is Ca and/or Mg.

37. A method, system and/or bundle; according to any one of the preceding items, wherein the composition of the glass consist of, in mass-%:

Si: 20 to 98%, optionally 40 to 75%, optionally 50 to 65%;

$B_2O_3$: 0 to 30%, optionally 1 to 15%, optionally 3 to 9%;

$Al_2O_3$: 0 to 30%, optionally 10 to 20%, optionally 13 to 18;

$X_2O$: 0 to 30%, optionally 0 to 5%, optionally 0 to 3%, wherein X is selected from Na, K, Li, optionally X is Na and/or K;

YO: 0 to 50%, optionally 0.1 to 40%, optionally 10 to 35, wherein Y is selected from Ca, Mg, Ba, optionally Y is Ca and/or Mg; and unavoidable impurities.

38. A method, system and/or bundle; according to any one of the preceding items, wherein the elongated glass element is a tube or rod, optionally a tube; and/or wherein the cut elongated glass elements is a cut glass tube, a cut glass rod or a glass pharmaceutical packaging; and/or wherein the cut elongated glass elements is a cut glass tube comprising a first end, a cylindrical portion and/or, optionally and, a second end, wherein the first and/or second end are open or closed, optionally wherein the first end and second end are open or closed.

39. A method, system and/or bundle; according to any one of the preceding items, wherein the cut elongated glass element is a tube or rod and/or, optionally and, comprises a first end, a second end and cylindrical portion, and wherein the length of the cylindrical portion of the cut elongated glass element is 1 cm or more and 1000 cm or less, optionally 20 cm or more and 400 cm or less, optionally 60 cm or more and 300 cm or less, optionally 100 cm or more and 200 cm or less, optionally 120 cm or more and 180 cm or less.

40. A method, system and/or bundle; according to any one of the preceding items, wherein the cut elongated glass element is a pharmaceutical packaging and/or, optionally and, comprises a first end, a second end and cylindrical portion, and wherein the length of the cylindrical portion of the cut elongated glass element is 1 mm or more and 50 cm or less, optionally 0.5 cm or more and 40 cm or less, optionally 1.0 cm or more and 30 cm or less, optionally 2 cm or more and 20 cm or less, optionally 3 cm or more and 15 cm or less, optionally 4 cm or more and 12 cm or less, optionally 5 cm or more and 10 cm or less, optionally 6 cm or more and 8 cm or less.

41 A method, system and/or bundle; according to any one of the preceding items, wherein the elongated glass element comprises a cylindrical portion, which exhibits an outer diameter of 0.5 mm to 500 mm, optionally 2 mm to 63 mm, optionally 5 mm to 60 mm, optionally 6 mm to 50 mm; and/or wherein the elongated glass element comprises a cylindrical portion, wherein the cylindrical portion is a tube and exhibits a wall thickness of 0.001 mm to 250 mm, optionally 0.1 mm to 32.5 mm, optionally 0.2 mm to 30 mm, optionally 0.25 mm to 25 mm.

42. A pharmaceutical packaging producible, optionally produced, from one or more cut elongated glass elements of the bundle according to any one of the preceding items.

43. A use of one or more cut elongated glass elements of the bundle according to any one of the preceding items to produce a pharmaceutical packaging or a technical glass, optionally a pharmaceutical packaging.

44. A method, system, bundle, pharmaceutical packaging and/or use; according to any one of the preceding items, wherein the pharmaceutical packaging is a vial, ampule, syringe and/or cartridge, optionally a syringe or cartridge.

Referring now to the drawing, the sole FIGURE shows schematic depiction of a system 1 provided according to an embodiment of the invention. In the beginning, molten glass 100 flows on a Danner mandrel 102, which is mounted on a motor 101. Meanwhile, the motor 101 continuously turns the Danner mandrel 102. The motor 101 and the Danner mandrel 102 are tilted such that the molten glass 100 reaches the lower end of the Danner mandrel 102, where a tube of molten glass is formed. The tube of molten glass 100 cools down and at a specific position 103, the tube of molten glass solidifies and a glass tube 10, i.e. a continuous elongated glass element 10, is formed. The solid glass tube 10 is drawn by the drawing device 23. At a position between the point where the molten glass solidifies 103 and the drawing device 23, one or more geometric parameter(s), for example the inner diameter, is/are continuously measured by a first measuring apparatus 21 while the glass tube 10 is continuously drawn by the drawing device 23. After the tube has passed the drawing device 23, it is separated, e.g. cut to length, by a cutting device 24 to obtain cut glass tubes 11, i.e. cut elongated glass elements 11. The system 1 comprises a sorting device 25, which sorts out the cut glass tubes 11, in which one or more geometric parameter(s) is/are not within a predetermined range. Subsequently, one or more geometric parameter(s) of the cut glass tube 10 is/are measured by a second measuring apparatus 22. A computer unit 20 is connected to the first measuring apparatus 21, the second measuring apparatus 22, the drawing device 23 and the cutting device 24 and continuously collects and the data therefrom. Further the computer unit 20 continuously calibrates the first measuring apparatus 21 and the second apparatus 22 and may also control whether the cut elongated glass element(s) 11 having one or more geometric parameter(s) being not inside a predetermined range has/have been sorted out by the sorting device 25. Finally, a further sorting device 26 sorts out the cut elongated glass element(s) 11 having one or more geometric parameter(s) being not inside a predetermined range and then the cut elongated glass element(s) 11 having a high quality are packed in a bundle 12.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE NUMERAL LIST

1 system
20 computer unit
21 first measuring apparatus
22 second measuring apparatus
23 drawing device
24 cutting device
25 sorting device
26 further sorting device
10 continuous elongated glass element, e.g. a continuous glass tube
11 cut elongated glass element, e.g. a cut elongated glass tube
12 bundle comprising cut elongated glass elements
100 molten glass
101 motor
102 Danner mandrel
103 point where the molten glass solidifies

What is claimed is:

1. A bundle, comprising:

five or more cut elongated glass elements, each cut elongated glass element comprising:

a first end;

a cylindrical portion; and a second end;

wherein at least one of the following equations is fulfilled:

$$(I_{center}(\text{max})-I_{center}(\text{min}))/I_{center}(\text{mean})\leq 4.0\times 10^{-2}\ [\mu m/\mu m]; \quad \text{i) or}$$

$$(I_{continuous}(\text{max})-I_{continuous}(\text{min}))/I_{center}(\text{mean})\leq 4.0\times 10^{-2}\ [\mu m/\mu m]; \quad \text{ii)}$$

wherein $I_{center}$(max) is a maximum center inner diameter of the cylindrical portions of all cut elongated glass elements in the bundle;

wherein $I_{center}$(min) is a minimum center inner diameter of the cylindrical portion of all cut elongated glass elements in the bundle;

wherein $I_{center}$(mean) is a mean of inner diameters at a center of the cylindrical portions of all cut elongated glass elements in the bundle;

wherein $I_{continuous}$(max) is a maximum continuous inner diameter of the cylindrical portion of any single cut elongated glass element in the bundle; and wherein $I_{continuous}$(min) is a minimum continuous inner diameter of the cylindrical portion of the single cut elongated glass element in the bundle, wherein the following equation is fulfilled: $c\leq(I_{continuous}(\text{max})-I_{continuous}(\text{min}))/I_{center}(\text{mean})$; wherein c in μm/μm is $1.0\times 10^{-6}$.

2. The bundle of claim 1, wherein the following equation is fulfilled:

$$(I_{center}(\max)-I_{center}(\min))/I_{center}(\text{mean})\leq b; \qquad \text{iv)}$$

wherein b in μm/μm is $4.0\times10^{-2}$.

3. The bundle of claim 2, wherein b in μm/μm is $1.0\times10^{-4}$.

4. The bundle of claim 2, wherein $I_{center}$(mean) is at least 2 mm.

5. The bundle of claim 4, wherein $I_{center}$(mean) is 100 mm or less.

6. The bundle of claim 1, wherein c in μm/μm is $1.0\times10^{-2}$.

7. The bundle of claim 1, wherein the following equation is fulfilled:

$$(I_{continuous}(\max)-I_{continuous}(\min))/I_{center}(\text{mean})\leq d; \qquad \text{vi)}$$

wherein d in μm/μm is $4.0\times10^{-2}$.

8. The bundle of claim 7, wherein d in μm/μm is $1.0\times10^{-4}$.

9. The bundle of claim 7, wherein $I_{center}$(mean) is at least 2 mm.

10. The bundle of claim 1, wherein ($I_{center}$(max)−$I_{center}$(min)) is 200 μm or less.

11. The bundle of claim 10, wherein ($I_{center}$(max)−$I_{center}$(min)) is 5 μm or less.

12. The bundle of claim 1, wherein at least one of the following equations is fulfilled:

$$(I_{center}(\max)-I_{center}(\text{mean}))\leq e, \text{ wherein } e \text{ is } 100\ \mu m; \qquad \text{vii) or}$$

$$(I_{center}(\text{mean})-I_{center}(\min))\leq f, \text{ wherein } f \text{ is } 100\ \mu m. \qquad \text{viii)}$$

13. The bundle of claim 12, wherein both equation vii) and equation viii) are fulfilled.

14. The bundle of claim 12, wherein at least equation vii) is fulfilled and e is 2 μm.

15. The bundle of claim 12, wherein at least equation viii) is fulfilled and f is 2 μm.

16. The bundle of claim 1, wherein a glass of the cut elongated glass elements is at least one of a borosilicate glass, an aluminosilicate glass, a lithium-aluminosilicate (LAS) glass, a soda-lime glass, a lead glass or a Type I glass according to ASTM E 438 and/or European Pharmaocopeia.

17. The bundle of claim 1, wherein both equation i) and equation ii) are fulfilled.

18. The bundle of claim 1, wherein the bundle comprises 1000 or less cut elongated glass elements.

19. The bundle of claim 1, wherein each of the cut elongated glass elements is a cut glass tube, a cut glass rod, or a glass pharmaceutical packaging.

* * * * *